C. C. ALGEO.
Improvement in Fire Place Fenders.
No. 121,073.
Patented Nov. 21, 1871.
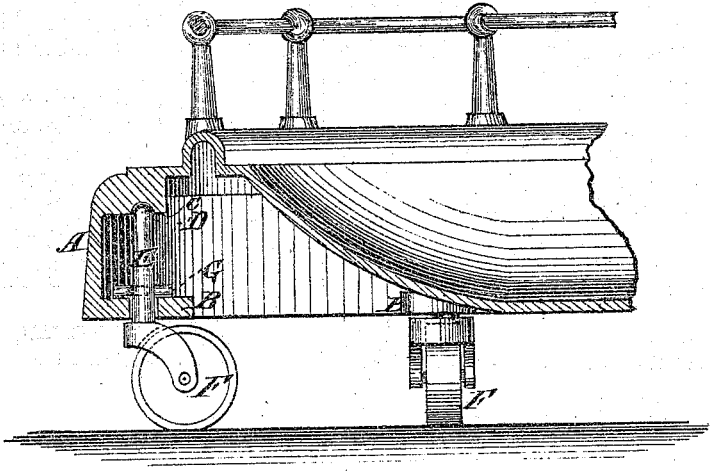

UNITED STATES PATENT OFFICE.

CHARLES C. ALGEO, OF PITTSBURG, PENNSYLVANIA.

IMPROVEMENT IN FIRE-PLACE FENDERS.

Specification forming part of Letters Patent No. 121,073, dated November 21, 1871.

*To all whom it may concern:*

Be it known that I, CHARLES C. ALGEO, of Pittsburg, in the county of Allegheny and State of Pennsylvania, have invented a new and useful Improvement in Attaching Casters to Fire-Place Fenders; and I do hereby declare that the following is a full, clear, and exact description thereof, which will enable others skilled in the art to make and use the same, reference being had to the accompanying drawing forming part of this specification.

My invention consists in having an inwardly-projecting flange at the base of the fender with the spindle or pivot of the caster passing through said flange up to the under side of the top of the fender, where a cavity is made for the reception of the top of the spindle, and the latter is confined against falling out by a pin passing through it above the aforesaid flange.

The drawing is a sectional elevation of a fireplace fender having the casters applied according to my improvement.

A is the fender; B, the inwardly-projecting flange at the base; and C, the under side of the top, having the cavities D over the holes made through the flanges for the spindles of the casters. E represents the spindle or pivot of the stock of the caster-wheel F, and is fitted through the flange B, and extends to the cavity D, where it receives the fender upon it and supports its weight, while the flange B maintains the shank in a vertical position. G is the pin by which the casters are held in position when the fender is lifted off the floor.

This plan is very simple in construction, and affords a more durable arrangement than any other in use.

Having thus described my invention, I claim as new and desire to secure by Letters Patent—

The fender, provided with the flange B having holes for the caster-spindles, also with the cavities D above the holes, and the caster-spindles fitted in the said holes and cavities and secured by pins G, all substantially as specified.

CHARLES C. ALGEO.

Witnesses:
J. H. HILLERMAN,
J. P. KINGSLAND. (154)